United States Patent Office 3,088,821
Patented May 7, 1963

3,088,821
OPEN HEARTH STEELMAKING PROCESS
Dalton F. Brion, Bethlehem, Pa., Carl F. Norbeck, Buffalo, N.Y., and Theodore B. Winkler, Bethlehem, Pa., assignors to Bethlehem Steel Company, a corporation of Pennsylvania
No Drawing. Filed Oct. 4, 1960, Ser. No. 60,294
4 Claims. (Cl. 75—52)

This invention relates to a method of operating an open hearth steelmaking furnace. It relates particularly to furnace operation using lances passing through a silica refractory roof of an open hearth furnace to inject oxygen into the molten bath.

It has long been known that the injection of oxygen or oxygen enriched air into the molten bath in an open hearth furnace will shorten heat time. However, it was not until recent developments in producing low cost oxygen that such practice has been able to be fully utilized.

Although the use of oxygen shortens the heat time, the splash and fumes resulting from its use have also reduced the life of the furnace refractories, particularly in the roof. Before the use of oxygen the standard refractories had been silica, although longer lasting but considerably more expensive basic refractories were available.

Because of the poor life of the silica refractories when used with oxygen, many producers have adopted the longer lasting but considerably more expensive basic roof refractories in order to obtain satisfactory roof life.

Accordingly it is an object of our invention to provide a method of operating an oxygen blown open hearth furnace having a silica roof to obtain a life equal to or better than that experienced with similarly lined conventional non-oxygen furnaces.

It is another object of our invention to provide a method of operating an oxygen blown open hearth furnace having a silica roof in which steel production can be increased from 20–50% over conventional non-oxygen furnaces.

Because the use of oxygen lances provides a supplementary source of oxygen which results in the rate of carbon elimination being increased two or threefold over that of a conventionally operated open hearth furnace, it has been found necessary to adjust the furnace charge of scrap, hot metal, ore and limestone to permit working of the heat so that the desired bath chemistry and tapping temperature are arrived at simultaneously.

In essence, the use of oxygen decreases the ore requirement relative to hot metal, or in other words, the ratio of ore to hot metal is lower than that required for a conventional non-oxygen furnace.

Two methods for adjustment of the charge have been used. By the first method, the quantity of ore charged is not changed from conventional non-oxygen practice, but the hot metal charge is increased approximately 10–25% and the scrap charge is correspondingly reduced an equivalent amount to maintain a constant metallic charge weight.

In the second method, the ore charge is reduced approximately 25–85% from conventional non-oxygen practice and the hot metal charge is correspondingly increased to maintain a constant metallic charge weight. The charge ore reduction method is desirable from the refractory viewpoint because it reduces the fuming action during the oxygen blow.

In either of the foregoing methods, whenever temporary limited supply of hot metal makes it expedient, a small portion, e.g., 1% to 10%, of the hot metal may be replaced by cold pig iron which is of a composition similar to the hot metal.

For both charging methods, the limestone charge can be reduced by any desired amount or even completely eliminated to help insure a desirable melt. In this event, an equivalent amount of burnt lime or limestone is substituted by additions made to the bath after the flush.

In Table I below are examples illustrating the two methods of charge adjustment described above.

Table I
HOT METAL INCREASE METHOD

| Furnace Size | | Oxygen Furnace Charge | | Conventional Furnace Charge | |
|---|---|---|---|---|---|
| | | Pounds | Percent Metallics | Pounds | Percent Metallics |
| 380 T | Scrap | 325,000 | 38 | 395,000 | 47 |
| | Hot Metal and Cold Iron | 480,000 | 57 | 410,000 | 48 |
| | Ore | 65,000 | 5 | 65,000 | 5 |
| | Stone | 8,000 | | 16,000 | |

ORE REDUCTION METHOD

| 380 T | Scrap | 325,000 | 38 | 325,000 | 38 |
|---|---|---|---|---|---|
| | Hot Metal and Cold Iron | 509,000 | 60 | 476,000 | 56 |
| | Ore | 25,000 | 2 | 75,000 | 6 |
| | Stone | 15,000 | | 20,000 | |
| | Lime | 9,000 | | 9,000 | |

The roof lances are lowered into the furnace through openings in the roof immediately following the hot metal addition. If there is scrap under the lance positions the lances are lowered to within 3 to 4 inches of the scrap. As the scrap melts, the lances are lowered still farther to the final operating position which is no greater than 8 inches and preferably approximately 4 inches above the slag-metal interface. This means that in the early part of the heat when the slag is foamy, especially during the flush, the lances are being operated well below the slag surface. Operating at this position increases oxygen efficiency, reduces splash and minimizes foaming of the slag.

It has been found that putting the lance closer than 4 inches to the slag-metal interface results in shorter lance life whereas satisfactory lance life is achieved when operating at approximately the 4 inch level.

All lances should be equipped with accurate indicating devices. The operating position can be determined at the end of the previous oxygen blown heat and the position of the indicator marked. On the following heat the lance can be lowered to this designated position, once protruding scrap beneath the lance is melted.

Oxygen consumption, expressed as cubic feet per ton of steel ingots, has been found by experience to control directly the time interval between finish hot metal and tap, that is, the higher the oxygen consumption, the shorter the interval. However, maximum oxygen consumption is limited by certain features of furnace construction, such as size of combustion chamber, roof height, roof type, and capacity of forced air and induced draft fans. Therefore, the optimum oxygen consumption for any furnace is the maximum oxygen consumption that it is possible to use within the limits of that furnace's construction characteristics. This consumption appears to be in the range of 600–800 cubic feet/ton. The minimum should be somewhat above 400 cubic feet/ton. Table II below gives examples of various furnace sizes along with acceptable consumption ranges and the necessary flow rates.

*Table II*

| Furnace Size | Approx. O₂ Consumption, c.f./ton | O₂ Flow, c.f.h./lance | No. of lances | O₂ Flow c.f.h./furnace |
|---|---|---|---|---|
| 180 | 600–800 | 20,000–30,000 | 2 | 40,000–60,000 |
| 270 | 500–700 | 25,000–35,000 | 2 | 50,000–70,000 |
| 385 | 500–750 | 35,000–60,000 | 2 | 70,000–120,000 |
| 385 | 650–850 | 35,000–50,000 | 3 | 105,000–150,000 |

Furnaces have been operated with single, double and triple lance installations. Although single lance operation has proved successful on some furnaces, multiple lance operation appears more desirable if furnace dimensions will not accommodate the splash associated with the desired oxygen flow rates. This condition arises because the greater the tonnage capacity of the furnace the higher the oxygen flow rate must be to accomplish the same relative rate of carbon removal. However, by using a plurality of lances, the splash at each can be kept within tolerable limits while still securing the desired oxygen consumption per ton.

We prefer to use lances having a plurality of nozzles with equal radial spacing and diverging from the center line of the lance.

It has been found that the efficiency of utilization of oxygen is affected not only by lance position but also by the mass velocity of the oxygen at the tips of the lance nozzles. Mass velocity is defined as the weight rate of flow divided by the area of the given cross section. According to this invention the nozzles are sized so that the mass velocity of the oxygen at the nozzle tip always exceeds 100 lbs./sec.×sq. ft.

The maximum oxygen flow through a lance with nozzles of a given size is dependent on available line pressure. An oxygen supply pressure of 100–125 p.s.i. is amply high to accommodate the full range of practical oxygen flow rates, provided pipe lines are sized to avoid excessive pressure drop.

Nozzle diameters have been determined for the examples given in Table II. These are set forth in the following Table III.

*Table III*

| Furnace Size, Tons | No. of lances | Practical Oxygen Flow, c.f.h./lance | Nozzles No. | Nozzles Size | Mass Velocity, lb./sec. ×sq. ft. |
|---|---|---|---|---|---|
| 180 | 2 | 20,000–30,000 | 6 | ⅜ | 100–150 |
| 270 | 2 | 25,000–35,000 | 6 | ⅜ | 125–175 |
| 385 | 2 | 35,000–40,000 | 6 | ⅜ | 175–200 |
| 385 | 2 | 40,000–60,000 | 6 | ½ | 112–169 |
| 385 | 3 | 35,000–40,000 | 6 | ⅜ | 175–200 |
| 385 | 3 | 40,000–50,000 | 6 | ½ | 112–140 |

It can be seen that the mass velocities for the various flow rates shown in Table III range from 100 to considerably higher values.

The combustion practice for an oxygen furnace is the same as for a conventional non-oxygen furnace from the start of charge to finish hot metal. As soon as the lances are lowered at finish hot metal, the firing rate is adjusted to maintain the roof temperature in the oxygen furnace from 75 to 200° F. below roof temperature at a comparable period in a non-oxygen furnace.

It has been our experience on several oxygen furnaces that the roof temperature is readily controlled to the desired value by reducing the firing rate to about 70% of that on a conventional furnace as soon as the lances are lowered. To maintain the roof temperature at the aforesaid values later in the heat, it is necessary to reduce the firing rate further or even shut it off completely for a time.

As an example, one conventional non-oxygen furnace had roof temperature limits of 2925° F. on the incoming end of the roof and 3100° F. on the outgoing end. Excellent results were obtained when using oxygen on this furnace by keeping the indicated temperature limits on the incoming end of the roof below 2850° F. and the temperature limits on the outgoing end below 3025° F.

Even though the fuel input is reduced, the combustion air volume is maintained at a value which insures several percent of free oxygen, preferably not less than 5%, in the exhaust gases, measured in the downtakes at floor level.

It has also been found desirable to regulate the furnace pressure well below conventional non-oxygen practice. In non-oxygen practice it is customary for the gases to be blowing out at the wicket hole on two to four outgoing doors. On the oxygen furnace, it is desirable to have the pressure less than atmospheric, i.e., a suction at the wicket holes of all doors.

As an example of this change in pressure when using oxygen, the normal operating roof pressure on one furnace was 0.10 to 0.11 inch of water. When using oxygen, this was reduced to 0.05 inch of water. These values do not apply to all furnaces because of design variations and location of the pressure tap, but they illustrate the degree of pressure reduction found desirable when using oxygen lances.

Thus, oxygen lance furnaces which have been operated with oxidizing atmospheres, adequate draft and low roof temperatures have shown very favorable refractory life.

Thus, it has been discovered that by making certain substantial departures from conventional non-oxygen operating practices and by controlling the introduction of oxygen in the manner set forth above, one can greatly increase the production of an open hearth furnace using oxygen lances and at the same time achieve satisfactory refractory life when using the conventional silica lining.

By using the practice set forth it has been possible to obtain refractory life from the silica roof lining equal to or slightly better than that experienced on conventional non-oxygen furnaces.

Although the method we have discovered has its primary value with silica roofs such practice is equally applicable with basic roofs in order to obtain longer life spans between rebuilding.

In the claims, the expression "molten pig iron" is intended to include where necessary, a small proportion of cold pig iron, as explained hereinabove.

Although we have described our invention, we do not wish to be limited to the exact and specific methods described, but may use such substitutions, modifications or equivalents, as are embraced within the scope of the invention claimed.

We claim:

1. A method of operating an open hearth steelmaking furnace, comprising the steps of charging iron ore, limestone or burnt lime, ferrous scrap and molten pig iron into the furnace, burning a fuel above said charge until the charging operation is complete, thereafter applying gaseous oxygen for the refining of the resulting bath from a plurality of nozzles about 4″ above the slag-metal interface at a mass velocity above 100 lb./sec.×sq. ft., reducing the firing rate once the application of gaseous oxygen has begun and maintaining an atmosphere in the downtakes containing several percent free oxygen and a furnace pressure less than atmospheric at all doors of the furnace.

2. The method of claim 1 in which the open hearth steelmaking furnace has a silica refractory roof.

3. The method of controlling the atmosphere of an oxygen-blown open hearth steelmaking furnace during the refining stage comprising the steps of reducing the firing rate of the burner immediately after the introduction of gaseous oxygen and maintaining an atmosphere containing several percent free oxygen in the downtakes and maintaining a furnace pressure less than atmospheric at all doors of the furnace.

4. The method of claim 3 in which the atmosphere in the downtakes has more than 5% free oxygen.

References Cited in the file of this patent

UNITED STATES PATENTS

| | | |
|---|---|---|
| 2,446,511 | Kerry et al. | Aug. 3, 1948 |
| 2,515,631 | Chiswik | July 18, 1950 |
| 2,515,670 | Slottman et al. | July 18, 1950 |
| 2,878,115 | Schane et al. | Mar. 17, 1959 |

FOREIGN PATENTS

| | | |
|---|---|---|
| 933,098 | France | Dec. 17, 1947 |

OTHER REFERENCES

Open Hearth Proceedings, vol. 31, A.I.M.E., 1948, pages 27–35.

Open Hearth Proceedings, vol. 42, A.I.M.E., 1959, pages 250–267.